United States Patent
Jung (10) Patent No.: US 12,459,124 B2
(45) Date of Patent: Nov. 4, 2025

(54) COLLABORATIVE SAFETY AWARENESS FOR ROBOTIC APPLICATIONS ENABLED BY AUGMENTED REALITY AND OTHER LOCATION-BASED TECHNOLOGIES

(71) Applicant: FANUC AMERICA CORPORATION, Roshester Hills, MI (US)

(72) Inventor: Derek Jung, Clinton Township (CA)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 208 days.

(21) Appl. No.: 18/352,547

(22) Filed: Jul. 14, 2023

(65) Prior Publication Data
US 2024/0033923 A1    Feb. 1, 2024

Related U.S. Application Data

(60) Provisional application No. 63/369,569, filed on Jul. 27, 2022.

(51) Int. Cl.
*B25J 9/16* (2006.01)
*B25J 13/06* (2006.01)
*G06T 7/73* (2017.01)

(52) U.S. Cl.
CPC ............. *B25J 9/1676* (2013.01); *B25J 13/06* (2013.01); *G06T 7/73* (2017.01); *G05B 2219/32014* (2013.01); *G05B 2219/39449* (2013.01); *G05B 2219/40202* (2013.01); *G06T 2207/30204* (2013.01)

(58) Field of Classification Search
CPC ........ B25J 9/1674; B25J 9/163; B25J 9/1664; B25J 9/1666; B25J 9/1676; B25J 19/0075; B25J 19/06; B25J 13/06; G06T 19/006; G06T 7/73; G06T 2207/30204; G06T 2207/30244; G05B 2219/39451; G05B 2219/39449; G05B 2219/35318; G05B 2219/35506; G05B 2219/40202;
(Continued)

(56) References Cited

U.S. PATENT DOCUMENTS

9,588,519 B2 * 3/2017 Stubbs ................. G05D 1/0261
10,832,548 B2 * 11/2020 Nguyen ................. G08B 21/02
(Continued)

*Primary Examiner* — Ramon A. Mercado
*Assistant Examiner* — Noah W Stiebritz
(74) *Attorney, Agent, or Firm* — John A. Miller; Shumaker, Loop & Kendrick, LLP (57) ABSTRACT

A collaborative safety awareness system for robotic applications enabled by augmented reality (AR). One or more robots in a work cell are in communication with an application running on an AR device worn or held by an operator in the work cell. The AR device may be a headset apparatus, or a tablet or teach pendant device. A dynamic safety zone is created around the operator and the location of the dynamic safety zone is continuously updated by the robot controller based on the position of the AR device provided by the AR application, where the position of the AR device is determined using inertial sensors and visual odometry. The robot controller prohibits motion of the robot into the dynamic safety zone, and slows or reroutes the robot as needed to prevent an interference condition between the robot and the dynamic safety zone.

18 Claims, 5 Drawing Sheets

(58) Field of Classification Search
CPC ........... G05B 2219/32014; G05B 2219/40317; G05B 2219/40476
See application file for complete search history.

(56) References Cited

U.S. PATENT DOCUMENTS

| | | | |
|---|---|---|---|
| 11,571,815 B2* | 2/2023 | Verma | B60W 30/095 |
| 2019/0389066 A1* | 12/2019 | Jung | B25J 9/1661 |

* cited by examiner

COLLABORATIVE SAFETY AWARENESS FOR ROBOTIC APPLICATIONS ENABLED BY AUGMENTED REALITY AND OTHER LOCATION-BASED TECHNOLOGIES

CROSS-REFERENCE TO RELATED APPLICATIONS

This application claims the benefit of the priority date of U.S. Provisional Patent Application Ser. No. 63/369,569, titled COLLABORATIVE SAFETY AWARENESS FOR ROBOTIC APPLICATIONS ENABLED BY AUGMENTED REALITY AND OTHER LOCATION-BASED TECHNOLOGIES, filed Jul. 27, 2022.

BACKGROUND

Field

This invention relates to the field of robot operational safety zone establishment and, more particularly, to a system which uses an augmented reality (AR) device worn or held by a user to establish and continuously update a robot operational safety zone around the user, where the robot is prohibited from entering the user safety zone.

Discussion of the Related Art

Industrial robots are complex machines which are capable of performing many different functions precisely and reliably. In some situations, it is necessary for a human operator to be located in a work cell in close proximity to an operating robot. It is known to those familiar with robot installations/applications to define operational zones which define either allowed or prohibited spatial movement of the robot. Operational zones are used in many ways—including as safety zones in which robot operation is prohibited, and conditional safety zones where robot operation is prohibited under a certain condition such as the presence of a human operator. However, operational safety zones are traditionally manually defined and are static; that is, when a safety zone is established, the zone embodies a fixed space within the robot work cell, and it is the responsibility of any person in the robot work cell to stay within the safety zone.

Some existing robotic safety systems include multiple safety zones, and individual operational safety zones are triggered as being active when sensors detect the presence of an object within the predefined boundaries of a particular safety zone. These systems have the advantage of being somewhat adaptive to user presence, but such systems cannot distinguish between a person and another object, they cannot anticipate the user's future position based on velocity, and they still require the establishment of predefined static safety zones while also requiring sensors to be provided for object detection within each of the safety zones.

In light of the state of the art described above, it is desired to provide a collaborative safety awareness system for industrial robots where a safety zone is defined and its location is continuously updated based on the position of an operator within the robot work cell.

SUMMARY

In accordance with the teachings of the present disclosure, a collaborative safety awareness system for robotic applications enabled by augmented reality is disclosed. One or more robots in a work cell are in real time communication with an application running on an augmented reality (AR) device in the possession of an operator in the work cell. The AR device may be a headset apparatus worn by the operator, or a tablet or teach pendant device held by the operator. A dynamic safety zone is created around the operator and the location of the dynamic safety zone is continuously updated by the robot controller based on the position of the AR device provided by the AR application, where the position of the AR device is known by the AR application using internal inertial sensors and visual odometry. The robot controller prohibits motion of the robot into the dynamic safety zone, and slows or reroutes the robot as needed to prevent an interference condition between the robot and the dynamic safety zone.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a collaborative safety awareness system for robotic applications enabled by augmented reality is merely exemplary in nature, and is in no way intended to limit the disclosed devices and techniques or their applications or uses.

It is known in the industrial robot user community to define safety zones and other types of spatial zones which are relevant to the motion of a robot—such as a zone which the robot is prohibited from entering. These safety zones and other types of zones are sometimes collectively referred to as operational zones.

Operational zones are commonly used to establish boundaries of motion for industrial robots and other types of machines. Throughout the following discussion and the corresponding figures, the operational zones are described and shown in the context of industrial robots. However, the disclosed systems and methods are applicable not only to robots but also to any other type of machine which moves through spatial envelopes where interferences, collisions and operator safety may be a concern.

Many different types of operational zones may be established—including three dimensional (3D) volumes which define a permitted or prohibited motion space, interference check zones which establish spatial buffers around robot arms and other items, and joint position check zones which monitor robot joint positions. Operational zones are traditionally established before production operations of a robot in its work cell, and then the speed and position of the robot are continuously checked against these zones to make sure the robot is always respecting the boundaries of the defined zones. The following discussion of the techniques of the present disclosure is directed to operational safety zones for protection of a human operator.

Figure 1:
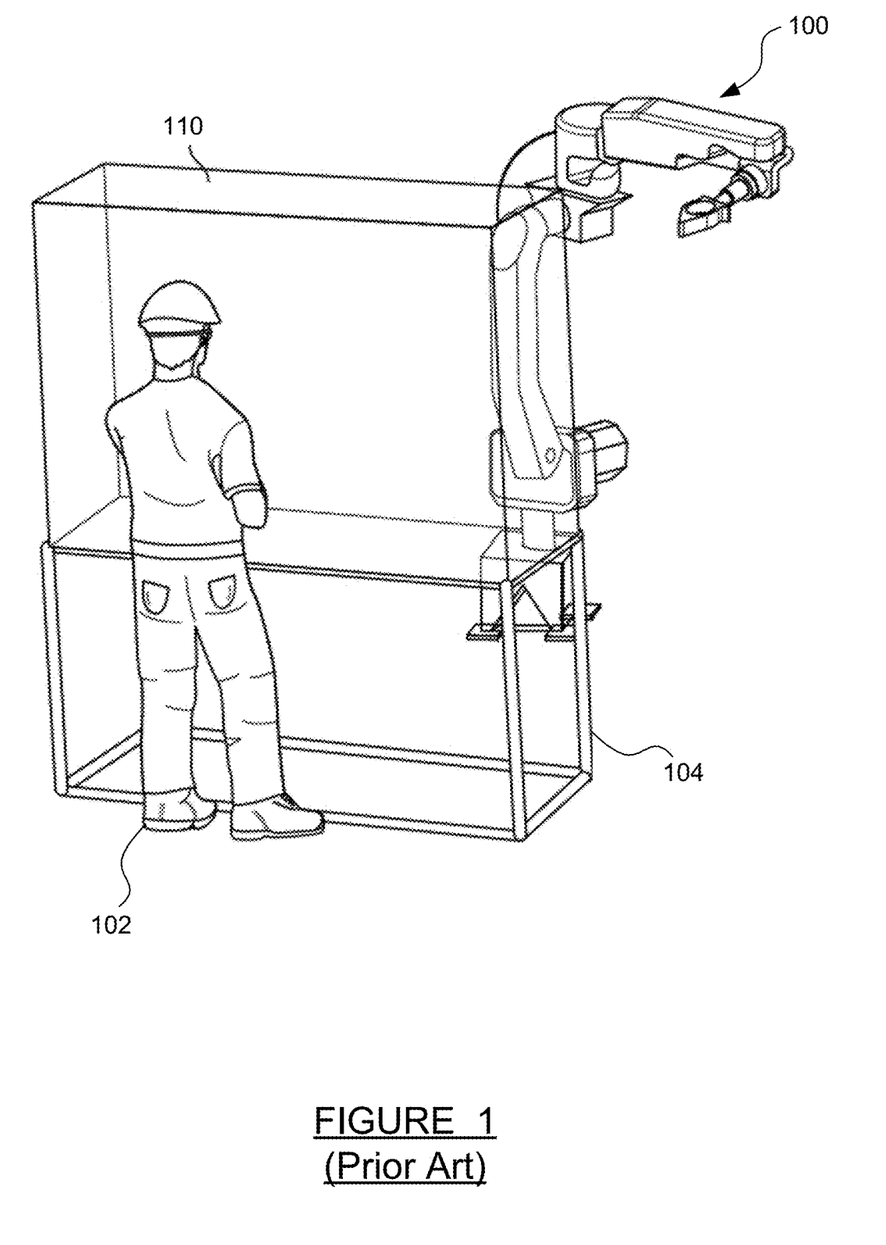
FIG. 1 is an illustration of an industrial robot, a human operator, and an operational zone established as a safety zone for protection of the operator, as known in the art.

FIG. 1 is an illustration of an industrial robot 100, a human operator 102, and an operational zone 110 established as a safety zone for protection of the operator 102, as known in the art. A table 104 serves as a stand or platform upon which a workpiece may be placed for operation thereon by the robot 100. The operational zone 110 as illustrated in FIG. 1 has a shape of a regular hexahedron, however, the operational zone 110 could have any shape—including asymmetry, non-planar surfaces, cylindrical and spherical volumes, etc. The operational zone 110 illustrated in FIG. 1 is a safety zone defining a prohibited space for the robot 100 directly above the table 104. Furthermore, the zone 110 is a conditional safety zone, meaning that the zone 110 is prohibited for robot incursion only when the operator 102 is present adjacent the table 104, as may be indicated by a floor pad (which detects weight when the operator 102 is standing on it) or a sensor (such as an infrared sensor or an optical sensor which detects blockage of a light beam).

The operational zone 110 of FIG. 1 illustrates a type of adaptive safety zone, where the robot 100 is allowed to enter the zone 110 when the operator 102 is not present adjacent the table 104, and the robot 100 is prohibited from entering the zone 110 when the operator 102 is present adjacent the table 104. While this type of safety zone is useful, it cannot be adaptively repositioned based on the actual location of the operator 102, and it is the responsibility of the operator 102 to understand the limitations of the operational zone 110. For example, if the operator 102 walks around to the opposite side of the table 104 to retrieve a dropped part, the zone 110 is completely ineffective in protecting the operator 102 from contact by the robot 100.

Other known robot safety systems define multiple safety zones, and use sensors to determine the presence of an operator or other object in any of the zones. These systems can be expensive due to the number of sensors required, difficult and time-consuming to configure due to the need for multiple predefined zones, and still do not have the flexibility to adapt to ad hoc operator movements.

The use of augmented reality (AR) systems in conjunction with industrial robots is also known. For example, an AR system which assists a person in defining operational bounding zones was described in U.S. patent application Ser. No. 16/453,811, titled "VISUALIZATION AND MODIFICATION OF OPERATIONAL BOUNDING ZONES USING AUGMENTED REALITY", filed Jun. 26, 2019, hereby incorporated by reference in its entirety. In addition, an AR system which assists an operator in defining robot pick-and-place parameters was described in U.S. patent application Ser. No. 16/453,838, titled "AUGMENTED REALITY VISUALIZATION FOR ROBOTIC PICKING SYSTEM", filed Jun. 26, 2019, hereby incorporated by reference in its entirety.

The AR systems mentioned above use an AR device—typically either a headset apparatus or a tablet computer device—to overlay computer-generated virtual elements (such as zone boundaries, virtual parts, etc.) on images of a real-world robot and other objects in the work cell. In order to properly depict the virtual elements relative to the robot and other objects, the AR device and the AR application software must know the location and orientation of the AR device within the work cell at all times.

Figure 2:
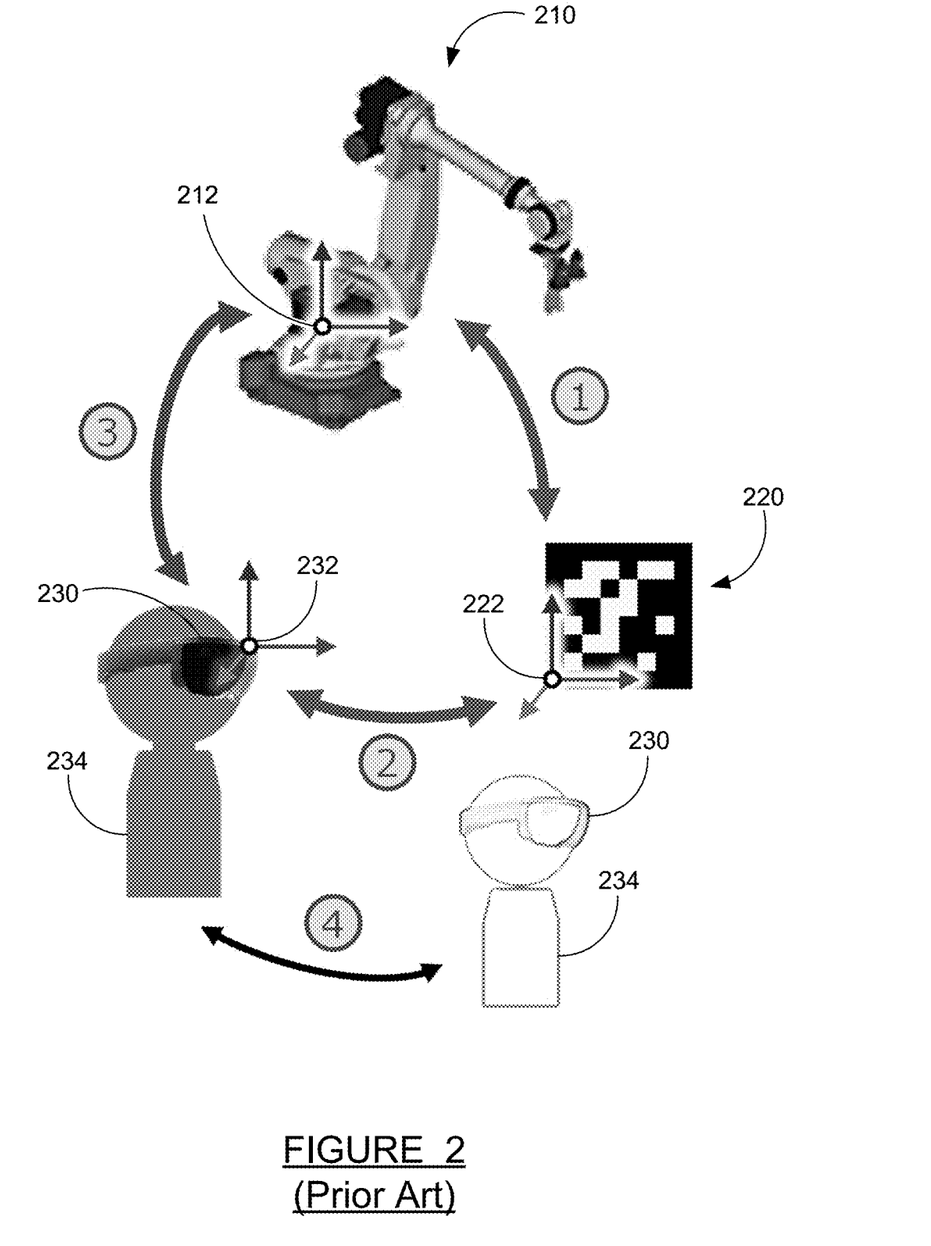
FIG. 2 is an illustration of a technique for registering and tracking a location of an augmented reality (AR) device in a robot work cell, as known in the art.

FIG. 2 is an illustration of a technique for registering and tracking a location of an AR device in a robot work cell, as known in the art. A robot 210 is mounted in a work cell and has defined a robot base reference frame (coordinate system) 212. The robot 210 may have many other reference frames defined, such as one for each robot arm, and the position and orientation of each of these other reference frames may be defined directly or indirectly in terms of the base reference frame 212, as would be known by one skilled in the art. However, for the purposes of establishing an AR device location relative to the robot 210, only the base reference frame 212 is important.

A visual marker 220 is placed at a fixed location somewhere in the work cell. A marker reference frame 222 has an origin and orientation defined with respect to the marker 220. For example, the marker reference frame 222 may have its origin at one corner of the marker 220, and its X and Y axes extending along two edges of the marker 220. The location and orientation of the marker reference frame 222 with respect to the robot base reference frame 212 (shown as step ①) are determined through a measurement and calibration process known in the art. This process may include making precise measurements of position and orientation of the marker 220.

An AR device 230 has an AR device reference frame 232 defined thereon. The AR device 230 is preferably a headset apparatus wearable by a user 234, where the headset includes a processor, inertial sensors, a camera and goggles which overlay computer-generated 3D images on top of the user's view of real-world objects. The AR device 230 may also be a handheld device such as a mobile phone, a tablet device or a robot teach pendant, in which case the device 230 still includes a processor, inertial sensors, a camera and a display screen, in addition to the required communications system. The AR device 230 runs an AR application on its processor.

Registering the AR device 230 to the robot base reference frame 212 is performed by pointing the camera in the AR device 230 at the visual marker 220 (shown as step ②) so that a plurality of images of the marker 220 are captured by the AR device 230. In practice, this is accomplished by pointing the camera of the AR device 230 at the marker 220 so that the marker 220 appears in the display of the AR device 230; natural movement of the AR device 230 (due to it being held or worn by a person) provides subsequent images of the marker 220 (which has a pattern and a location which are known to the robot controller and the AR application) from slightly different perspectives, allowing the AR application to determine the position and orientation of the AR device reference frame 232 relative to the marker reference frame 222. Because the position and orientation of the marker reference frame 222 relative to the robot base reference frame 212 are known from step ①, the AR application can compute the position and orientation of the AR device reference frame 232 relative to the robot base reference frame 212 (shown as step ③). Other methods of registering the AR device 230 to the robot base reference frame 212 may be used as would be apparent to those skilled in the art.

After the position and orientation of the AR device 230 are registered with the robot base reference frame 212, inertial and visual odometry are used by the AR application to continuously track the position and orientation of the AR device 230 relative to the robot base reference frame 212. In this technique (shown as step ④), the processor in the AR device 230 receives signals from accelerometers and gyros onboard the device 230 and continuously computes updated position and orientation of the device 230 based on integration of the acceleration and yaw rate signals. The position and orientation are checked and corrected based on images from the camera on the device 230, such as images of the marker 220 or other recognizable items which exist at a known location.

As would be understood by one skilled in the art, the robot base reference frame 212 need not be actually on the robot base, but rather may be any work cell coordinate frame, which is simply a fixed coordinate system in the work cell in which the robot operates. Straightforward transformations may be used to compute robot arm positions, the location of the marker 220, and the dynamic locations of the AR device 230, in any fixed work cell coordinate frame.

The technique shown in FIG. 2 and discussed above enables AR application software running on an AR device to continuously determine the position and orientation of the AR device relative to a robot and its work cell, which is a necessary capability in order for the AR device to accurately display virtual elements superimposed on real-world objects in the AR display. Because AR devices are now commonly used by operators in robot work cells, this AR device location tracking capability can be leveraged to provide dynamic operator safety zone features according to the following discussion.

In addition, any other location tracking technology may be used, instead of or in addition to the use of the visual marker and inertial and visual odometry discussed above. For example, a system could track the location of the AR device by triangulating signals from multiple transceivers, and the orientation of the AR device could be provided using yaw rate sensor or image data from the AR device. Any suitable combination of technologies may be used to provide the position and orientation of the AR device relative to the robot and its work cell, which is then used for the establishment of dynamic safety zones as discussed below.

Figure 3:
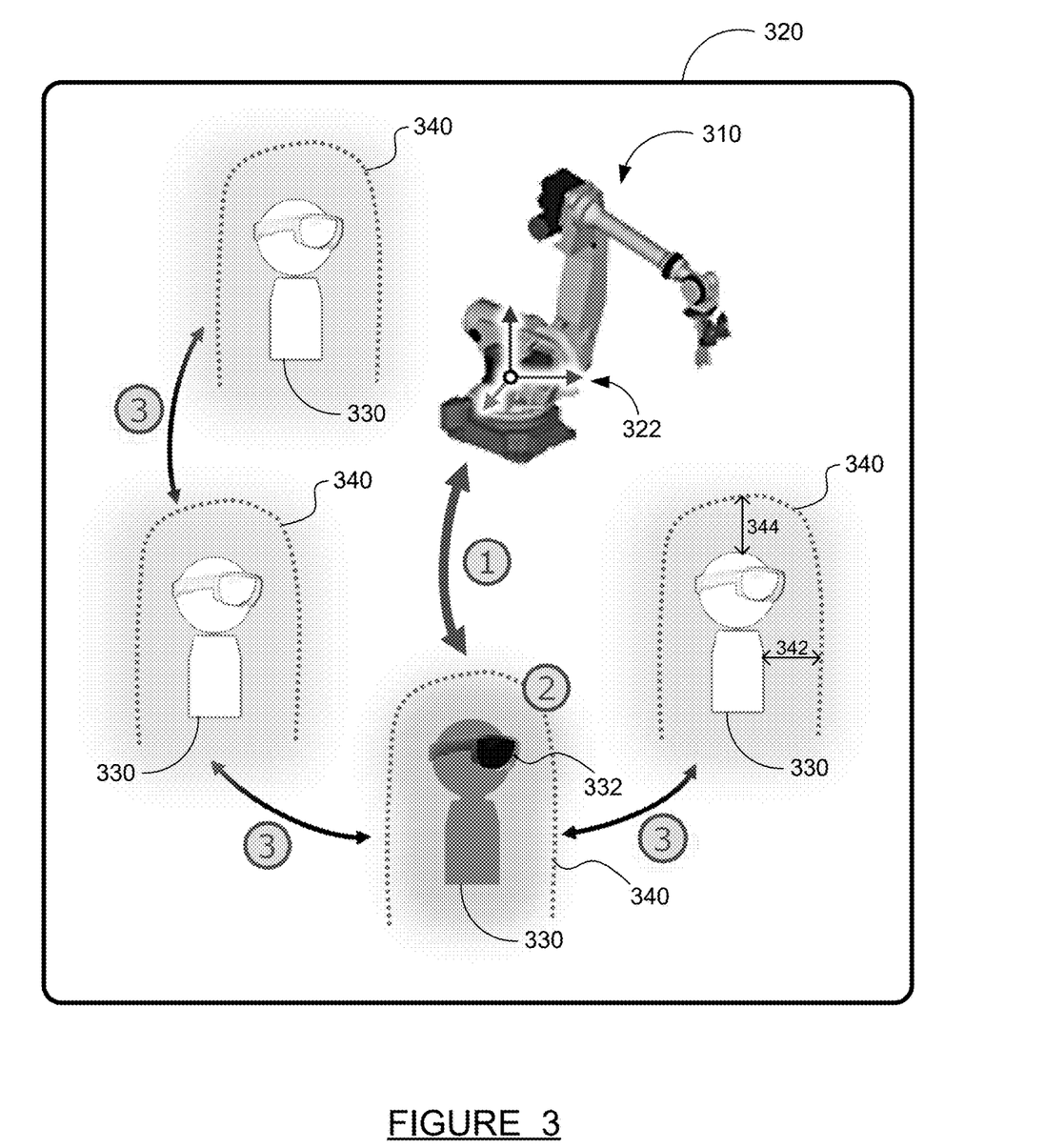
FIG. 3 is an illustration of a technique for providing a dynamic safety zone for an AR device operator in a robot work cell, according to an embodiment of the present disclosure.

FIG. 3 is an illustration of a technique for providing a dynamic safety zone for an AR device operator in a robot work cell, according to an embodiment of the present disclosure. A robot 310 operates within a work cell 320. A base reference frame 322 is defined at a fixed location in the work cell 320 such that a robot controller knows at all times the location of all robot arms and tools relative to the base reference frame 322 (which may be any fixed work cell coordinate frame, not necessarily on the robot base).

An operator 330 wearing an AR device 332 is also located within the work cell 320. Operator presence within a work cell during robot operation is increasingly common, both during robot set-up and validation, and during actual production robot operations. As discussed earlier, many different operator activities within the work cell may be facilitated by an AR application, thus necessitating the operator 330 to wear the AR device 332. As also discussed earlier, the AR device 332 (depicted as a headset, a preferred embodiment) may be a tablet computing device or a robot teach pendant rather than a headset apparatus.

The location of the AR device 332 relative to the base reference frame 322 is determined at step ① of FIG. 3 as described in detail in the discussion of FIG. 2. A dynamic safety zone 340 (shown at step ②) is defined around the operator 330 based on the location of the AR device 332. The dynamic safety zone 340 is of course a three-dimensional volume of space. The dynamic safety zone 340 moves with the operator 330 according to the location of the AR device 332, which is tracked by AR device application software. As the operator 330 moves around the work cell 320 (illustrated in various locations as step ③), the dynamic safety zone 340 automatically moves accordingly, always keeping the operator 330 within a zone which the robot 310 is prohibited from entering. As discussed further below, the AR device application software continuously communicates the location of the AR device 332 to the robot controller which controls robot motion and prevents any part of the robot 310 from entering the dynamic safety zone 340.

The dynamic safety zone 340 may be configured with many different parameters as suitable for any particular application. For example, the dynamic safety zone 340 may be configured to have a horizontal (or radial) buffer 342 and a vertical buffer 344 around the operator 330. Alternately, the dynamic safety zone 340 may be defined as a vertical cylinder (with optional hemispherical top end) with a particular radius and height, where the radius and height may have default values and may also be user-specified. The dynamic safety zone 340 need not be cylindrical in shape; other shapes may be defined as suitable for a given application. The configurations of the dynamic safety zone 340 (size/shape, and behavior types discussed below) may be performed using the AR device application software and then communicated to the robot controller, or the configuration may alternately be performed directly on the robot controller.

If the AR device 332 is a handheld device (such as a tablet or teach pendant), the AR device application software can be configured to compensate for the slight offset of the device location from the centroid of the operator 330. For example, the device 332 is typically held about a foot in front of the operator 330, so the center of the dynamic safety zone 340 can be adjusted accordingly, where the location of the operator 330 relative to the device 332 is known from the device orientation. This same offset compensation, although considerably smaller, may also be applied in the case of a headset apparatus.

Movement of the dynamic safety zone 340 may also be anticipated, and/or the size of the dynamic safety zone 340 compensated, based on the velocity of the AR device 332. For example, the position of the dynamic safety zone 340 at a future time increment may be anticipated based on the velocity of the AR device 332. Alternately, or in addition, the size of the dynamic safety zone 340 may be increased ("stretched horizontally") in the direction of motion to cover the anticipated future location of the operator 330. These velocity-based adjustments may be made by the AR device application software and communicated to the robot controller, or the adjustments may be made by the robot controller itself. In any case, it is the robot controller which ultimately computes and controls robot motion while strictly respecting the boundaries of the dynamic safety zone 340. The velocity may be determined directly by the AR device, or calculated based on previous position and orientation data.

In addition to preventing any part of the robot 310 from entering the dynamic safety zone 340, the robot controller can make other adjustments to robot movement based on the dynamic safety zone 340 and information from the AR device application software. These adjustments may include reducing the speed of the robot 310, or commanding the robot 310 to take a different path in moving a tool from one location to another. For example, in many cases, the robot 310 is running a program which defines the motion of a tool—such as picking and placing a part, or performing a series of welding operations along predefined paths. If a calculation of future robot position indicates that any part of the robot 310 (the tool or any arm) will encroach upon the dynamic safety zone 340, or will encroach upon a location where the dynamic safety zone 340 will be at that future time, then the controller may reduce the speed of the robot 310 below the speed prescribed in the program. Of course, if safety zone encroachment still becomes imminent even after robot velocity reduction, then the controller will completely stop the movement of the robot 310.

In another example of collaboration and adaptation, if the dynamic safety zone 340 is located such that it would be encroached by the robot tool or arm when the robot tool moves from a present location to a next programmed location, then the controller could reroute the robot tool to avoid the encroachment. The rerouting could involve going "up and over" the dynamic safety zone 340, or around the dynamic safety zone 340, or any other combination of arm motions which allow the robot 310 to reach the next programmed location while avoiding the dynamic safety zone 340.

Figure 4:
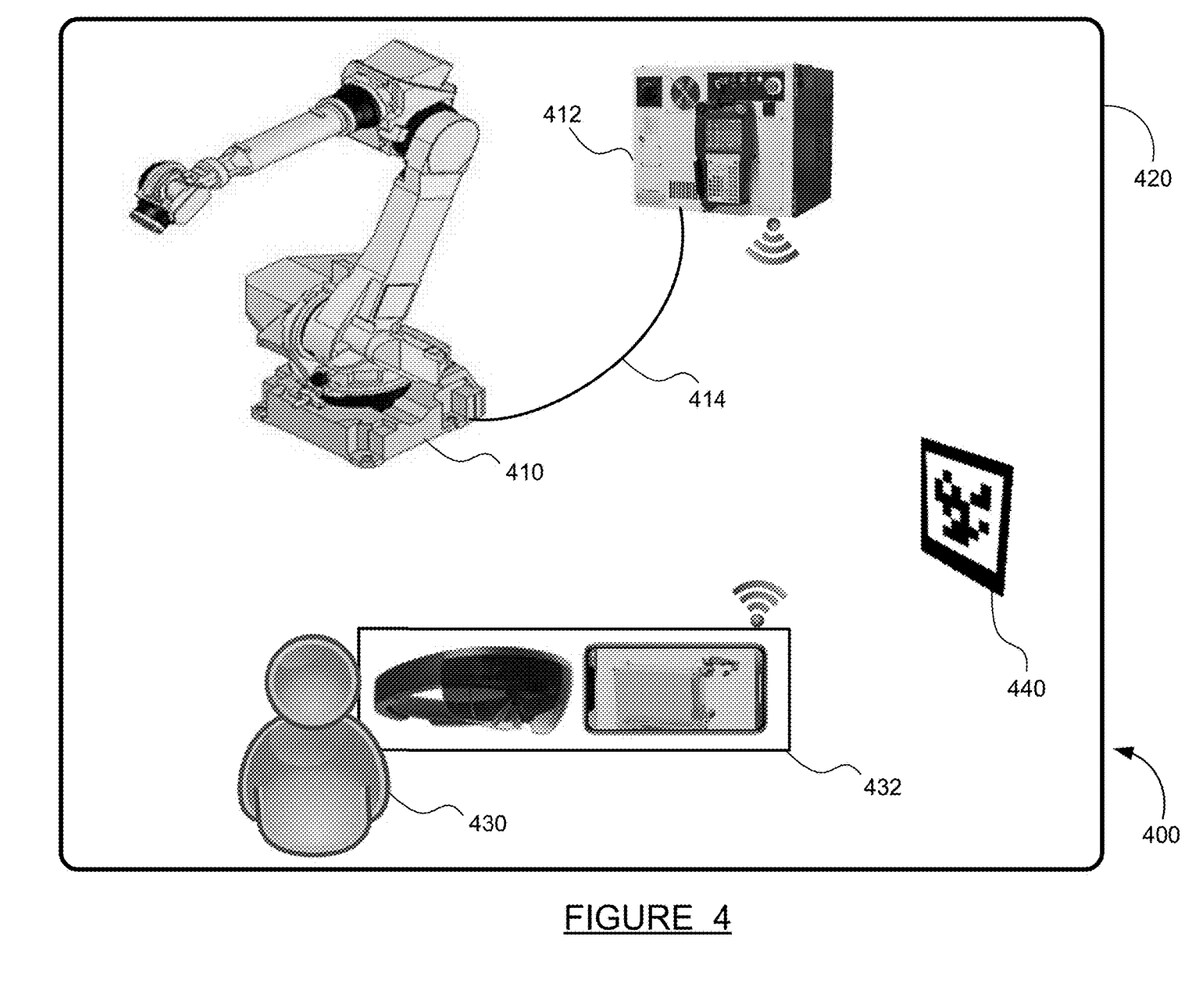
FIG. 4 is an illustration of a system for providing a dynamic safety zone for an AR device operator in a robot work cell, according to an embodiment of the present disclosure.

FIG. 4 is an illustration of a system 400 for providing a dynamic safety zone for an AR device operator in a robot work cell, according to an embodiment of the present disclosure. A robot or other machine 410 is located in and operates in a work cell 420. The robot 410 is depicted as a traditional multi-axis industrial robot, but may be a robot or any other type of machine which moves through spatial envelopes where interferences, collisions and operator safety may be a concern—including, but not limited to, industrial robots configured for part/material movement, welding, painting or other applications.

The robot 410 communicates with a controller 412, typically via a cable 414, but also possibly wirelessly. As is known in the art, the controller 412 includes a processor and memory with instructions for operating the robot 410 according to a program, where the controller 412 receives position information from joint encoders on the robot 410 and sends commands to the robot 410 defining joint motor motion. Only one robot 410 is shown, but the system 400 may include many of the robots 410 operating within the work cell 420. When more than one of the robots 410 is included in the system 400, each of the robots 410 may have its own controller 412, and the controllers 412 communicate with each other—to share dynamic safety zone information and other data.

An operator 430 is present in the work cell 420 during operations of the robot 410. The operator 430 uses an AR device 432 to run an augmented reality application program. As discussed above, the AR device 432 may be a headset apparatus worn by the operator 430 or a handheld device (e.g., a tablet or a teach pendant) held by the operator 430. When the AR device 432 is a headset, the headset includes a processor, inertial sensors, a camera and goggles which overlay computer-generated 3D images on top of the user's view or camera images of real-world objects. The AR device 432 may also be a handheld device such as a mobile phone, a tablet device or a robot teach pendant, in which case the device 432 still includes a processor, inertial sensors, a camera and a display screen, in addition to the required communications system. An AR application program provides augmented reality features and functions used in robot configuration to the operator 430—such as virtual displays of robot paths, programs, boundaries and/or outputs (e.g., caulk beads) superimposed on the operator's view of the robot 410 and other elements located in the work cell 420.

The AR device 432 is in wireless communication with the controller 412 so that the AR application program and the robot control program can maintain a two-way exchange of data. At a minimum, the AR application program provides the location and orientation of the AR device 432 to the controller 412 so that the robot control program running on the controller 412 can establish a dynamic safety zone around the operator 430, as discussed with respect to FIG. 3. The wireless communication between the AR device 432 and the controller 412 may be via a wireless local area network (WiFi), Bluetooth, cellular communication or any other suitable wireless technology.

The system 400 also includes a visual marker 440 at a fixed location and orientation somewhere in the work cell 420. The location and orientation of the marker 440, along with its size, shape and visual design details, are known to the controller 412 from prior set-up and configuration of the work cell 420. The AR device 432 includes at least one camera which is used for providing images of the robot 410 and other items to the AR application program. As discussed earlier, to calibrate the location of the AR device 432 in the work cell 420, digital images of the marker 440 are taken when the operator 430 aims the camera at the marker 440. The processor in the AR device 432 analyzes the images and determines a position and orientation of the AR device 432 relative to the marker 440. The AR device 432 thereafter uses inertial sensors and visual odometry to continuously compute its location and orientation relative to the marker 440, which is communicated to the controller 412 and used by the controller 412 to establish a dynamic safety zone which is positioned around the operator 430 at all times. Adjustments may be made to the dynamic safety zone based on AR device velocity, type of AR device, etc., as discussed earlier.

If the work cell 420 includes a plurality of the robots 410, then the AR device 432 preferably communicates wirelessly with only one of the controllers 412 (designated as a master), the dynamic safety zone is computed once by the master and shared with all of the controllers 412 which communicate over a (wired or wireless) local area network.

Many different configuration options are possible for the behavior of the dynamic safety zone. Configuration may take place in the robot control program running on the controller 412 and/or in the AR application program running on the AR device 432. For example, the dynamic safety zone may be a feature which is activated by the operator 430 in the AR application program. Alternately, the dynamic safety zone may be defined as active at all times when the AR device 432 is within the work cell 420 and powered on. Size, velocity-sensitivity, and other parameters describing the behavior of the dynamic safety zone are preferably configured by the operator 430 in the AR application program. Ultimately, it is the robot control program running on the controller 412 that honors the dynamic safety zone by preventing safety zone incursion by any part of the robot 410 and adjusting robot speeds and routings as necessary.

Several known techniques for incorporating safety zones into robot motion commands may be used with the dynamically-located safety zone of the present disclosure. For example, padded operational zones (oblong "bubbles") may be defined around each robot arm and move with the arms, and an impending interference between any of the padded arm operational zones and the dynamic safety zone can cause the controller 412 to fully stop the robot 410. In this way, the padding (free space) of the operational zones around the robot arms, and the padding of the dynamic safety zone around the operator 430, provide an extra margin of safety to prevent any actual contact of the robot 410 with the operator 430.

Known techniques may also be used for slowing down or rerouting the robot 410 to prevent an anticipated interference condition, as discussed earlier. When the dynamic safety zone feature is in operation, a loss of communication between the AR device 432 and the robot controller 412 can be detected by the controller 412 and cause the controller 412 to fully stop the robot 410. In this event, a warning is preferably displayed to the operator 430 on the AR device 432, advising the operator 430 of the loss of communication and the reason for the robot's stoppage.

Multiple operators 430, each with their own AR device 432, may be supported in a manner which is readily understandable. That is, each of the AR devices 432 has a dynamic safety zone associated with it and moving with it at all times, and all of the dynamic safety zones are honored by the robot controller 412. Similarly, multiple robots 410 and multiple operators 430 may be present within the work cell 420, in which case a dynamic safety zone for each of the operators 430 is defined and continuously updated, and all of the robot controllers 412 incorporate all of the dynamic safety zones into their robot motion control calculations. In the case of multiple robots 410, the robot motion control calculations may also include calculations designed to prevent robot-to-robot collisions.

In another embodiment of the present disclosure, the AR device 432 is an "enabling device" for robot operation. The concept of an enabling device is known to those skilled in the art of industrial robot configuration and set-up, where the enabling device serves as a type of operator presence switch, indicating that the operator is present and aware of the robot operation. In traditional robot configuration systems, a robot teach pendant is commonly used as the enabling device. In the techniques of the present disclosure, the AR device 432 and the automatically-located dynamic safety zone may eliminate the need for a robot teach pendant or other device serving as an enabling device.

It is to be understood that the AR device 432 is running an AR application program which is being used by the operator 430 for the program's beneficial features in robot set-up, configuration, operation, troubleshooting, or some other function. The dynamic safety zone which is defined by the location of the AR device 432 according the presently disclosed techniques is an additional beneficial feature which requires no additional sensors or other components.

The dynamic safety zone itself may be displayed on the display of the AR device, so that the operator can see the safety zone and its status while working in the robot workcell. Various other display options may be implemented as defined in the system configuration. For example, operational zones around robot arms may be color coded based on proximity to the dynamic safety zone in which the operator is present. In addition, a safety zone status window may be provided in the AR device display—which shows information such as when the robot slows down or reroutes its path to avoid an incursion of the dynamic safety zone.

Throughout the preceding discussion, the use of an AR device for establishing and automatically updating the location of an operator safety zone is disclosed. In some applications, the use of augmented reality is not needed, and a location-sensing device other than an AR device may be used for operator location determination. For example, an operator may have a smart phone in his/her pocket or otherwise on his/her person, where the smart phone includes WiFi, Bluetooth or other communication capability and inertial and/or other position tracking capability suitable for determining and communicating operator position. Other types of devices may also be used for determining and communicating operator position, as would be understood by those skilled in the art.

Figure 5:
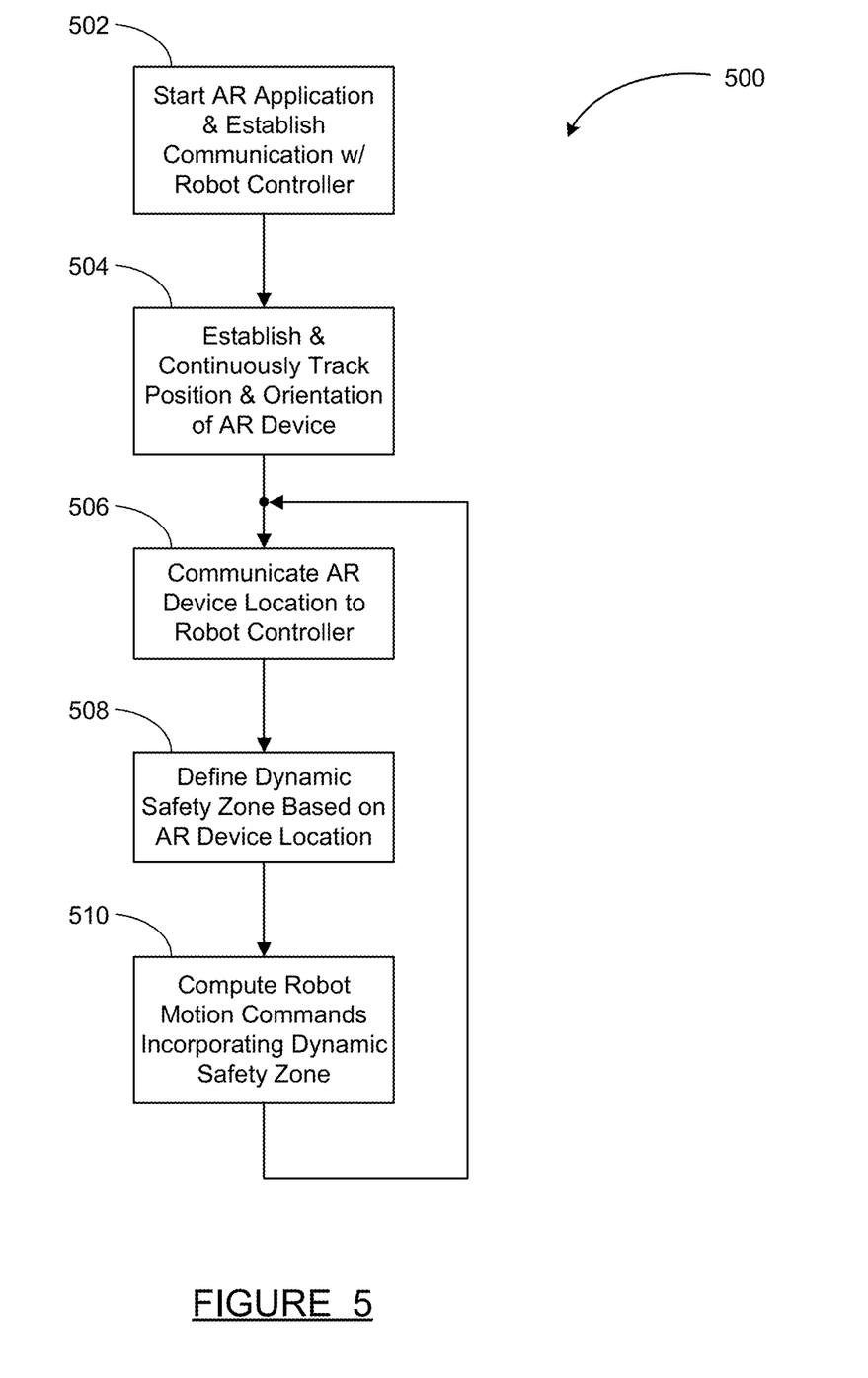
FIG. 5 is a flowchart diagram of a method for providing a dynamic safety zone for an AR device operator in a robot work cell, according to an embodiment of the present disclosure.

FIG. 5 is a flowchart diagram 500 of a method for providing a dynamic safety zone for an AR device operator in a robot work cell, employing the system 400 of FIG. 4, according to an embodiment of the present disclosure. At box 502, the operator 430 starts the AR software application (app) on the AR device 432 and the AR device 432 establishes communication with the robot controller 412 via a wireless communication channel, as discussed earlier. At box 504, the position and orientation of the AR device 432 are calibrated to a fixed coordinate system in the work cell 420 in which the robot 410 operates. The work cell coordinate frame is known to the robot controller 412, and robot joint positions and tool center position in the work cell coordinate frame can be calculated for all positional configurations of the robot 410. Calibrating the AR device 432 to the work cell coordinate frame may be performed by pointing the camera in the AR device 432 at the visual marker 440 which has a known position and orientation, as discuss earlier. Other methods of calibrating the AR device 432 to the work cell coordinate frame, besides imaging of the visual marker 440, may be used as would be apparent to those skilled in the art.

Still at the box 504, after the position and orientation of the AR device 432 are calibrated to the work cell coordinate frame, inertial and visual odometry are used by the AR application software to continuously track the position and orientation of the AR device 432 relative to the work cell coordinate frame. In this technique, the processor in the AR device 432 receives signals from accelerometers and gyros onboard the AR device 432 and continuously computes updated position and orientation of the AR device 432 based on integration of the acceleration and yaw rate signals. The position and orientation are checked and corrected based on images from the camera on the AR device 432, such as images of the marker 440, the robot base or other recognizable items which exist at a known location.

At box 506, the AR device 432 communicates the device location and orientation to the robot controller 412. At the same time, the operator 430 uses the AR application software, running on the AR device 432, for its intended purpose. As discussed earlier, the AR application software may be used for robot set-up, configuration, operation monitoring, troubleshooting, or some other function. At box 508, the robot controller 412 defines the dynamic safety zone based on the AR device location. The dynamic safety zone is defined and moved in such a way that the operator 430 is within the safety zone and protected from the robot 410 at all times. As discussed above, the safety zone may be centered around the AR device location, or offset slightly to compensate for the AR device location relative to the operator centroid. The safety zone may be configured with many different size and shape options, optional stretching or movement based on AR device velocity, etc. Regardless of the optional behavior parameters, the robot controller 412 always moves the dynamic safety zone based on the most recently received AR device location data to keep the operator 430 protected.

At box 510, the robot controller 412 incorporates the dynamic safety zone in robot motion control computations. At a minimum, this includes stopping the robot 410 if necessary to prevent incursion of any part of the robot 410 into the dynamic safety zone. Several other options are available for using the dynamic safety zone in robot motion control, including slowing and/or rerouting the robot arms if a possible conflict with the dynamic safety zone is anticipated. Also, padded operational zones ("bubbles") may be defined around each robot arm, and any intersection of the robot arm operational zones with the operator dynamic safety zone can be used to cause full stop of the robot 410, where the free space padding in the robot arm operational zones and the operator dynamic safety zone provide a margin of safety preventing any actual contact between a robot arm or tool with the operator 430.

Also at the box 510, the AR device may display information related to the dynamic safety zone—such as a geometric depiction of the safety zone, a color coded status of the safety zone, and an information window listing overall status and identifying any actions taken by the robot controller in order to respect the boundaries of the dynamic safety zone.

After the box 510, the process of the flowchart diagram 500 returns to the box 506 where the new current location and orientation of the AR device 432 are communicated to the controller 412 and the dynamic safety zone is relocated accordingly, and the process continuously loops in real time as long as the AR device 432 is powered on and located within the work cell 420. Multiple operators and/or multiple robots may be included in a like manner, where all robots receive location information from the AR devices of all operators, and all of the corresponding dynamic safety zones are protected from incursion by any of the robots.

Throughout the preceding discussion, various controllers are described and implied—for controlling motions and tasks of a robot, for operation of the AR device, etc. It is to be understood that the software applications and modules of these controllers are executed on one or more computing devices having a processor and a memory module, including algorithms configured in non-volatile memory. In particular, this includes processors in the robot controller 412 and the AR device 432 of FIG. 4 discussed above. The communication between the robots, their controllers and the AR devices may be over a hard-wire network, or may use any suitable wireless technology—such as a cellular phone/data network, Wi-Fi, Bluetooth, broadband Internet, etc.

As outlined above, the disclosed techniques for collaborative safety awareness for robotic applications enabled by augmented reality offer several advantages over prior art techniques. The ability to automatically move operator safety zones based on an AR device location, using the AR device and its location tracking capability inherent to the AR application, is far superior to prior techniques for manually defining static safety zones.

While a number of exemplary aspects and embodiments of the collaborative safety awareness system for robotic applications enabled by augmented reality have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for providing a dynamic safety zone for an operator in a machine work cell, said system comprising:
    a machine operable in a work cell;
    a machine controller in communication with the machine, said controller including a processor and memory and being configured with machine operational control software; and
    an augmented reality (AR) device in communication with the machine controller, said AR device having one or more cameras, position tracking sensors and a display, said AR device further including a processor and memory configured to run an AR application;
    where the AR application establishes and continuously tracks a position and orientation of the AR device relative to a work cell coordinate frame, and continuously communicates the position and orientation of the AR device to the machine controller,
    and the machine controller establishes and moves a dynamic safety zone encompassing the operator based on the position and orientation of the AR device, and incorporates the dynamic safety zone in machine motion control computations, including preventing any part of the machine from entering the dynamic safety zone,
    where the dynamic safety zone has a size and behavior parameters definable by the operator in the AR application or the machine operational control software, where the behavior parameters include an offset of a center of the dynamic safety zone from the position of the AR device based on the orientation and type of the AR device, and an adjustment of the position and the size of the dynamic safety zone based on a velocity vector of the AR device.

2. The system according to claim 1 wherein the AR device is a headset apparatus worn by the operator.

3. The system according to claim 1 wherein the AR device is a smart phone, a tablet computing device or a robot teach pendant held by the operator.

4. The system according to claim 1 wherein the AR application establishes the position and orientation of the AR device relative to the work cell coordinate frame by analyzing images of a visual marker having a known design and placed at a known location in the work cell coordinate frame.

5. The system according to claim 1 wherein the position tracking sensors include one or more gyroscopes and one or more accelerometers, where the sensors provide signals to the processor in the AR device enabling continuous computation of changes in position and orientation of the AR device.

6. The system according to claim 1 wherein the machine controller slows or reroutes motion of the machine in order to prevent a future interference of the machine with the dynamic safety zone.

7. The system according to claim 1 wherein the AR application is used by the operator while the machine controller establishes and moves the dynamic safety zone based on the position and orientation of the AR device.

8. The system according to claim 7 wherein the AR application provides virtual display elements superimposed on camera images of real-world objects, and the AR application is used by the operator for machine set-up, configuration, operation monitoring or troubleshooting.

9. The system according to claim 1 wherein the machine is an industrial robot.

10. The system according to claim 1 further comprising one or more additional machines in the work cell, one or more additional operators each having an AR device within the work cell, or both the additional machines and the additional operators, where a dynamic safety zone is defined for each of the operators and all of the dynamic safety zones are incorporated in the motion control computations for all of the machines to prevent any part of any machine from entering any of the dynamic safety zones.

11. A method for providing a dynamic safety zone for an operator in a machine work cell, said machine work cell including at least one machine in communication with a machine controller, said method comprising:
- establishing communication between an augmented reality (AR) device and the machine controller and starting an AR application on the AR device;
- establishing, by the AR application, a position and orientation of the AR device relative to a work cell coordinate frame and continuously tracking the position and orientation as the AR device is moved;
- continuously communicating the position and orientation of the AR device to the machine controller;
- creating and moving a dynamic safety zone encompassing the operator based on the position and orientation of the AR device,
- where the dynamic safety zone has a size and behavior parameters definable by the operator in the AR application or the machine operational control software, where the behavior parameters include an offset of a center of the dynamic safety zone from the position of the AR device based on the orientation and type of the AR device, and an adjustment of the position and the size of the dynamic safety zone based on a velocity vector of the AR device; and
- incorporating the dynamic safety zone in machine motion control computations, including preventing any part of the machine from entering the dynamic safety zone.

12. The method according to claim 11 wherein the AR device is a headset apparatus worn by the operator, or the AR device is a smart phone, a tablet computing device or a robot teach pendant held by the operator.

13. The method according to claim 11 wherein establishing the position and orientation of the AR device relative to the work cell coordinate frame includes analyzing images from a camera in the AR device of a visual marker having a known design and placed at a known location in the work cell coordinate frame, and continuously tracking the position and orientation includes analyzing signals from position tracking sensors in the AR device.

14. The method according to claim 11 wherein the machine controller slows or reroutes motion of the machine in order to prevent a future interference of the machine with the dynamic safety zone.

15. The method according to claim 11 wherein the AR application is used by the operator while the machine controller establishes and moves the dynamic safety zone based on the position and orientation of the AR device.

16. The method according to claim 11 wherein the AR application provides virtual display elements superimposed on camera images of real-world objects, and the AR application is used by the operator for machine set-up, configuration, operation monitoring or troubleshooting.

17. The method according to claim 11 wherein the at least one machine is an industrial robot.

18. A method for providing a dynamic safety zone for an operator in a machine work cell, said method comprising carrying a location-tracking device by the operator, continuously wirelessly communicating a position of the location-tracking device to a machine controller, defining a dynamic safety zone encompassing the operator based on the position of the location-tracking device, and incorporating the dynamic safety zone in machine motion control computations by the machine controller, including preventing any part of the machine from entering the dynamic safety zone, where the dynamic safety zone has a size and behavior parameters definable by the operator in the AR application or the machine operational control software, where the behavior parameters include an offset of a center of the dynamic safety zone from the position of the AR device based on the orientation and type of the AR device, and an adjustment of the position and the size of the dynamic safety zone based on a velocity vector of the AR device.

* * * * *